(12) United States Patent
Matsumoto

(10) Patent No.: US 10,870,316 B2
(45) Date of Patent: Dec. 22, 2020

(54) PNEUMATIC TIRE

(71) Applicant: SUMITOMO RUBBER INDUSTRIES, LTD., Kobe (JP)

(72) Inventor: Tadao Matsumoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 713 days.

(21) Appl. No.: 15/605,477

(22) Filed: May 25, 2017

(65) Prior Publication Data
US 2017/0259623 A1    Sep. 14, 2017

Related U.S. Application Data

(62) Division of application No. 13/963,228, filed on Aug. 9, 2013, now abandoned.

(30) Foreign Application Priority Data

Mar. 19, 2013  (JP) ................................. 2013-057065

(51) Int. Cl.
*B60C 13/00* (2006.01)
*B60C 13/02* (2006.01)

(52) U.S. Cl.
CPC ............ *B60C 13/001* (2013.01); *B60C 13/02* (2013.01)

(58) Field of Classification Search
CPC ..... B60C 13/00; B60C 13/001; B60C 13/002; B60C 13/003; B60C 13/02; B60C 13/023
See application file for complete search history.

(56) References Cited

FOREIGN PATENT DOCUMENTS

| | | |
|---|---|---|
| DE | 102008037483 A1 | 4/2010 |
| JP | 2003-182317 A | 7/2003 |
| JP | 2009-143488 A | 7/2009 |
| JP | 2011-37388 A | 2/2011 |

OTHER PUBLICATIONS

Extended European Search Report, dated Jul. 17, 2014, for European Application No. 13181348.7.
Machine translation of DE 102008037483, 2010.
U.S. Office Action for U.S. Appl. No. 13/963,228 dated Apr. 28, 2017.
U.S. Office Action for U.S. Appl. No. 13/963,228 dated Aug. 22, 2016.
U.S. Office Action for U.S. Appl. No. 13/963,228 dated Feb. 25, 2016.
U.S. Office Action for U.S. Appl. No. 13/963,228 dated Jan. 26, 2017.

*Primary Examiner* — Justin R Fischer
(74) *Attorney, Agent, or Firm* — Birch, Stewart, Kolasch & Birch, LLP

(57) ABSTRACT

A pneumatic tire with a pair of sidewall portions, which comprises at least one of said sidewall portions with a radially outer region being radially outside than a tire maximum width position of its outer surface, the radially outer region being provided with a serration pattern, the serration pattern comprising a first serration group and a second serration group, the first serration group comprising a plurality of concentrically arranged first arc-shaped ridges at regular intervals around a first center point O1, the second serration group comprising a plurality of concentrically arranged second arc-shaped ridges at regular intervals around a second center point O2 that is located radially outside than the first center point O1 of the first serration group, and the first serration group and second serration group arranged in a circumferential direction of the tire so as to overlap partially.

13 Claims, 6 Drawing Sheets

PRIOR ART

PNEUMATIC TIRE

This application is a Division of U.S. patent application Ser. No. 13/963,228 filed on Aug. 9, 2013, which claims priority under 35 U.S.C. § 119(a) to Patent Application No. 2013-057065 filed in Japan on Mar. 19, 2013, all of which are hereby expressly incorporated by reference into the present application.

BACKGROUND OF THE INVENTION

Field of the Invention

The present invention relates to a pneumatic tire having a sidewall portion with a serration pattern for improving appearance.

Description of the Related Art

Conventionally, a pneumatic tire comprises a carcass ply having a joint portion where both circumferential ends of the ply are spliced so as to form an annular shape since the joint portion of the carcass ply has a thickness and stiffness larger than those of the other portion, it may cause a radially extending bulge or dent on an outer surface of the sidewall portion that deteriorates sidewall appearance. In order that observers do not notice such as the dent or a bulge on the sidewall portion, the sidewall portion is provided with a serration pattern (b) which comprises a plurality of ridges (a) shown in FIG. 6, for example.

Conventional serration pattern (b) comprises straightly extending ridges (a) arranged with regular intervals in a circumferential direction of the tire. Typically, conventional ridges disclosed in Japanese patent application laid-open No. 2009-143488 are arranged in parallel with a radial direction of the tire. Japanese patent application laid-open No. 2003-182317 also discloses another aspect of conventional ridges inclined at an angle with respect to the radial direction of the tire.

Since the conventional ridges as mentioned above, however, offers with monotony pattern in visible contrast, observers may easily notice the dent or bulge through deformed ridges. In order to hide the dent or bulge inconspicuously, a plurality of irregularly arranged ridges in the circumferential direction of the tire and/or ridges having a large cross sectional height are proposed. However, such ridges as mentioned above tend to provide undesirable design and deteriorate the sidewall appearance. Additionally, in case that ridges have a large cross sectional height, it would be difficult to put marks for identifying a lightest or heaviest portions of the tire on the serration portion due to unsatisfactory adhesive bonding.

SUMMARY OF THE INVENTION

The present invention has been worked out in light of the circumstances described above, and has a main object of providing a pneumatic tire having an improved serration pattern for improving sidewall appearance by hiding the dent or bulge inconspicuously while having an excellent design.

In accordance with the present invention, there is provided a pneumatic tire having a pair of sidewall portions, which comprises at least one of said sidewall portions having a radially outer region being radially outside than a tire maximum width position of its outer surface, the radially outer region being provided with a serration pattern, said serration pattern comprising a first serration group and a second serration group, said first serration group comprising a plurality of concentrically arranged first arc-shaped ridges at regular intervals around a first center point O1, said second serration group comprising a plurality of concentrically arranged second arc-shaped ridges at regular intervals around a second center point O2 that is located radially outside than the first center point O1 of said first serration group, and said first serration group and said second serration group arranged in a circumferential direction of the tire so as to overlap partially.

Preferably, said first arc-shaped ridges and said second arc-shaped ridges have the same cross sections.

Preferably, said first arc-shaped ridges and said second arc-shaped ridges have the same intervals.

Preferably, said first serration group comprises a radially innermost first arc-shaped ridge having a radius of curvature in a range of from 0.5 to 10.0 mm, and said second serration group comprises a radially innermost second arc-shaped ridge having a radius of curvature in a range of from 0.5 to 10.0 mm.

Preferably, said first arc-shaped ridges and said second arc-shaped ridges have intervals P in a range of from 1.0 to 2.0 mm, said first arc-shaped ridges and said second arc-shaped ridges have cross sectional widths w in a range of from 0.1 to 0.6 mm, said first arc-shaped ridges and said second arc-shaped ridges have cross sectional heights H in a range of from 0.2 to 0.6 mm, and a circumferential length L between the first center point O1 and the second center point O2 is in a range of from 20 to 60 mm.

Preferably, said first arc-shaped ridges protrude radially outwardly of the tire, and said second arc-shaped ridges protrude radially inwardly of the tire.

Preferably, said serration pattern has a radially outer periphery edge and a radially inner periphery edge, said first center point O1 is provided in the vicinity of the radially inner periphery edge of said serration pattern, and said second center point O2 is provided in the vicinity of the radially outer periphery edge of said serration pattern.

DETAILED DESCRIPTION

An embodiment of the present invention will be explained below with reference to the accompanying drawings.

Figure 1:
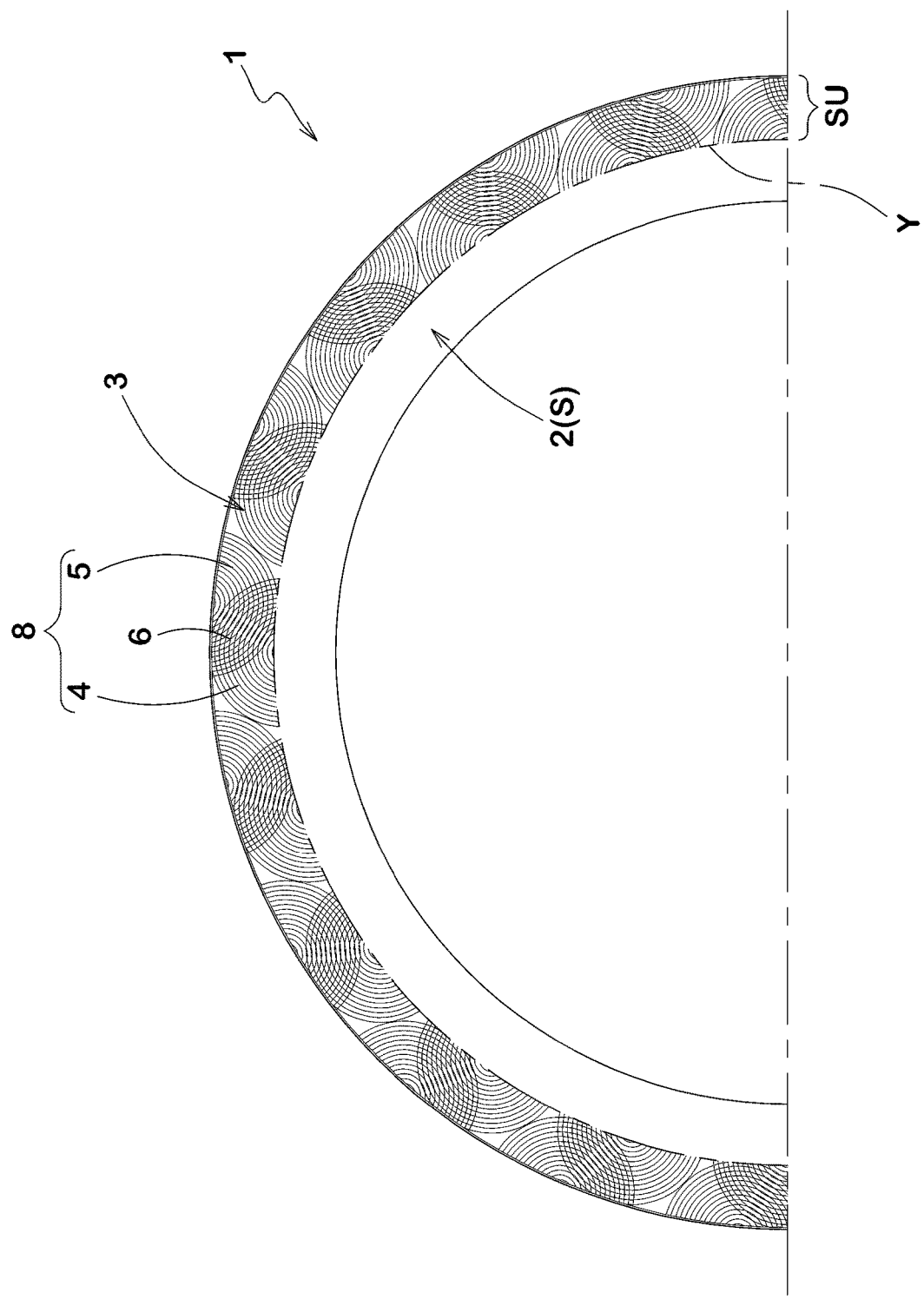
FIG. 1 is a side view of a pneumatic tire showing an embodiment of the present invention.

FIG. 1 shows a side view of a pneumatic tire 1 in accordance with the present embodiment. The tire 1 comprises a pair of sidewall portions 2, wherein an outer surface S of at least one of sidewall portions 2 is provided with a serration pattern 3 on radially outer region SU. Here, the radially outer region SU is a region being radially outside than a tire maximum width position Y within the outer surface S of the sidewall portion 2.

In this embodiment, the serration pattern 3 continuously extends in the circumferential direction of the tire so as to form an annular shape. In another aspect of the embodiment, the serration pattern 3 may partially extend in the circumferential direction of the tire so as to form an arc shape (not shown). In still further aspect of the embodiment, a plurality of spaced serration patterns 3 may be provided in the circumferential direction of the tire (not shown).

The serration pattern 3 comprises a first serration group 4 and a second serration group 5, wherein the first serration group 4 and the second serration group 5 are arranged alternately in the circumferential direction of the tire so that a partially overlapped region 6 is provided. In this embodiment, the serration pattern 3 comprises a plurality of serration pairs 8 that include the first and second serration groups 4, 5, respectively and are repeatedly arranged in the circumferential direction of the tire.

Figure 2:
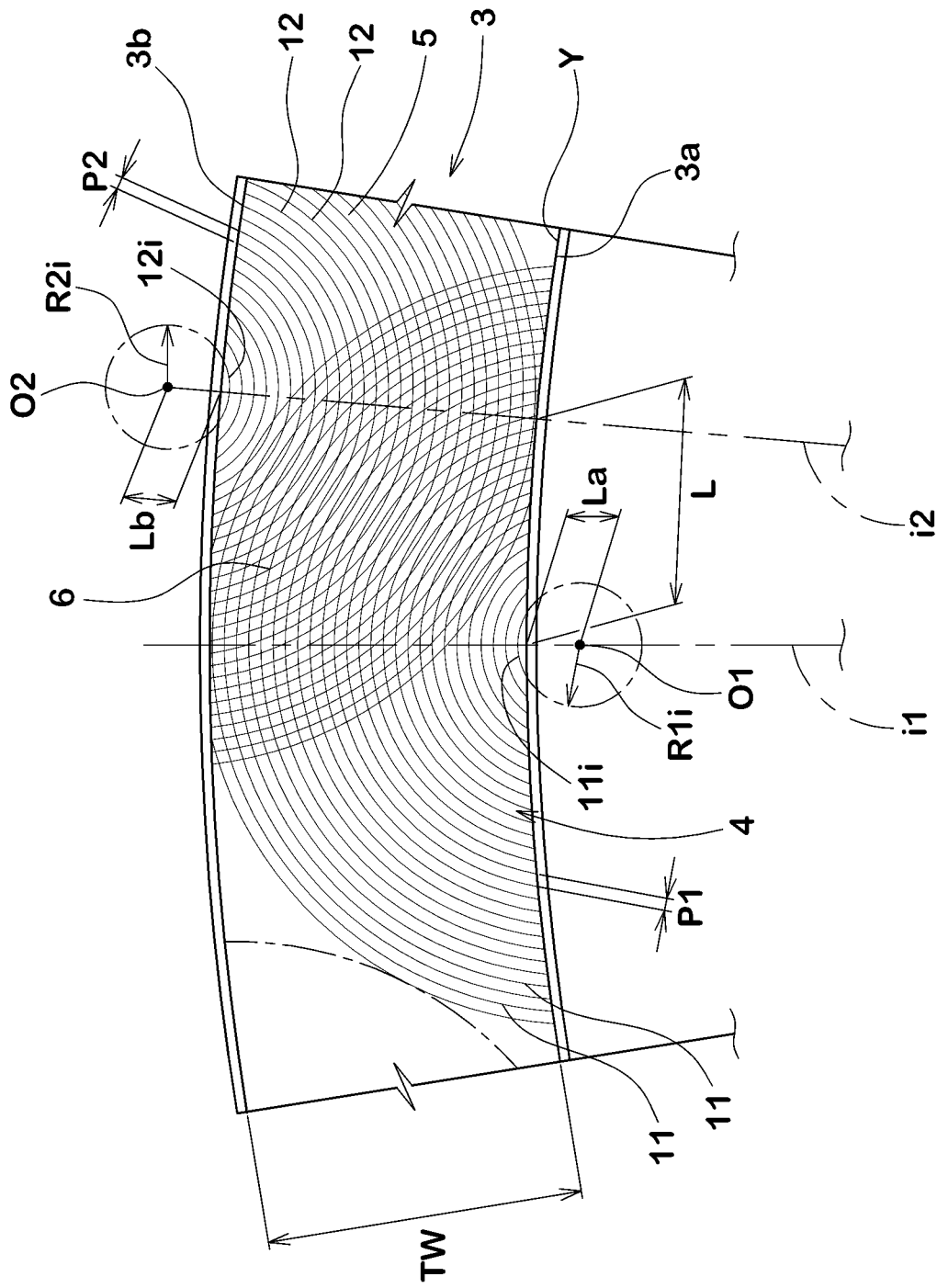
FIG. 2 is a partial enlarged view of a serration pattern of the tire.

FIG. 2 shows a partial enlarged view of the serration pattern 3 in this embodiment. Referring to FIG. 2, the first serration group 4 comprises a plurality of concentrically arranged first arc-shaped ridges 11 at regular intervals P1 around a center point O1.

The second serration group 5 comprises a plurality of concentrically arranged second arc-shaped ridges 12 at regular intervals P2 around a center point O2 that is located radially outside than the center point O1 of the first serration group 4.

In this embodiment, the serration pattern 3 is formed between a radially inner periphery edge 3a and a radially outer periphery edge 3b. The first center point O1 is provided in the vicinity of the radially inner periphery edge 3a of the serration pattern 3. Accordingly, the first serration group 4 has a semicircular shape having a chord at the side of the radially inner periphery edge 3a of the serration pattern 3. On the other hand, the second center point O2 is provided in the vicinity of the radially outer periphery edge 3b of the serration pattern 3. Accordingly, the second serration group 5 has a semicircular shape having a chord at the side of the radially outer periphery edge 3b of the serration pattern 3. Preferably, the first and second center points O1 and O2 are provided within 10 mm from the radially inner peripheral edge 3a and the radially outer peripheral edge 3b, respectively.

The first center point O1 and the second center point O2 are spaced with a length L in the circumferential direction of the tire. Preferably, the length L is in a range of from 20 to 60 mm. Here, the length L is a circumferential distance measured at the tire maximum width position Y between two radial lines i1, i2 that pass through the first center point O1 and the second center point O2, respectively. Preferably, the length L is in a range of from 28% to 86% with respect to a radial width TW of the serration pattern 3.

In this embodiment, the overlapped region 6 between the first and second serration groups 4, 5 provides observers with a visible contrast pattern having a leaf-like shape inclined at an angle with respect to the circumferential direction of the tire, whereby may offer unexpected fine impression to observers. Here, in case that the length L is less than 20 mm or a ratio L/TW is less than 28%, the angle of the leaf-like shape of the overlapped region 6 tends to be small. On the other hand, in case that the length L is more than 60 mm or a ratio L/TW is more than 86%, the area of leaf-like shape of the overlapped region 6 tends to be small.

Figure 3:
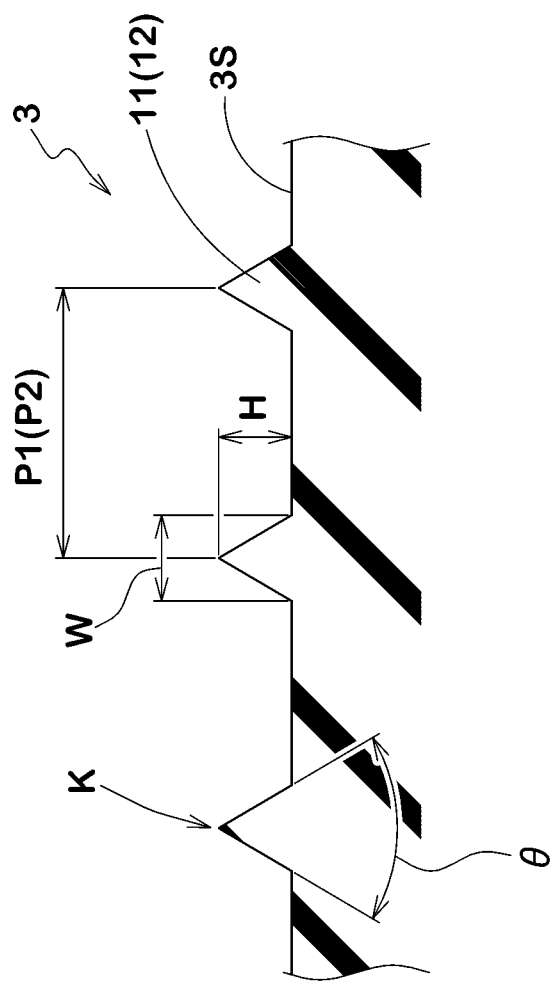
FIG. 3 is a cross sectional view of ridges of the serration pattern.

FIG. 3 shows a cross sectional view of ridges of the serration pattern 3. Referring to FIG. 3, the first and second arc-shaped ridges 11, 12 are protrusions that extend from a bottom 3S of the serration pattern 3 with a small height, respectively. In this embodiment, the first arc-shaped ridges 11 and the second arc-shaped ridges 12 have the same cross sections each other. Although various conventional shapes may be employed as for the cross section of ridges, a triangular shape having a top angle θ in a range of from 70 to 110 degrees or a trapezoid shape that is obtained from the triangular shape above by flattening or curving its top portion K are preferable.

In this embodiment, intervals P1 between adjacent first arc-shaped ridges 11, 11 are substantially equal to intervals P2 between adjacent second arc-shaped ridges 12. Preferably, intervals P1, P2 (hereinafter, these may be simply referred to "intervals P" as a general term.) are in a range of from 1.0 to 2.0 mm. preferably, first arc-shaped ridges 11 and second arc-shaped ridges 12 have cross sectional widths W in a range of from 0.1 to 0.6 mm. Preferably, first arc-shaped ridges 11 and second arc-shaped ridges 12 have cross sectional heights H in a range of from 0.2 to 0.6 mm.

As shown in FIG. 2, the first serration group 4 includes a radially innermost first arc-shaped ridge 11i that preferably has a radius of curvature R1i in a range of from 0.5 to 10.0 mm. The second serration group 5 includes a radially innermost second arc-shaped ridge 12i that preferably has a radius of curvature R2i in a range of from 0.5 to 10.0 mm.

In this embodiment, the first center point O1 of the first serration group 4 is positioned radially inward of the tire than the inner periphery edge 3a of the serration 3. Preferably, the first serration group 4 has the relation as follows:

$$0.5 \leq (R1i - La)/P \leq 1.5.$$

Here, "La" is a distance between the first center point O1 and the radially inner periphery edge 3a, "R1i" is the radius of curvature of the innermost first arc-shaped ridge 11i, and "P" is the interval between adjacent first arc-shaped ridges 11, 11.

In this embodiment, the second center point O2 of the second serration group 5 is positioned radially outward of the tire than the outer periphery edge 3b of the serration 3. Preferably, the second serration group 5 has the relation as follows:

$$0.5 \leq (R2i - Lb)/P \leq 1.5.$$

Here, "Lb" is a distance between the second center point O2 and the radially outer periphery edge 3b, "R2i" is the radius of curvature of the innermost second arc-shaped ridge 12i, and "P" is the interval between adjacent second arc-shaped ridges 12, 12.

The overlapped region 6 in the serration pattern 3 is a region where first arc-shaped ridges 11 and second arc-shaped ridges 12 cross each other so as to have intersections that are arranged within a leaf-like pattern. On the other hand, non-overlapped regions are arranged in circumferentially both sides of the overlapped region 6, where a pattern of concentric circles is made of either first arc-shaped ridges 11 or only second arc-shaped ridges 12, which is a brightly visible field in contrast to the overlapped region 6.

Accordingly, the serration pattern 3 in accordance with the present invention may provide an unexpected and significant change of patterns in contrast using constant intervals of ridges.

Figure 4A:
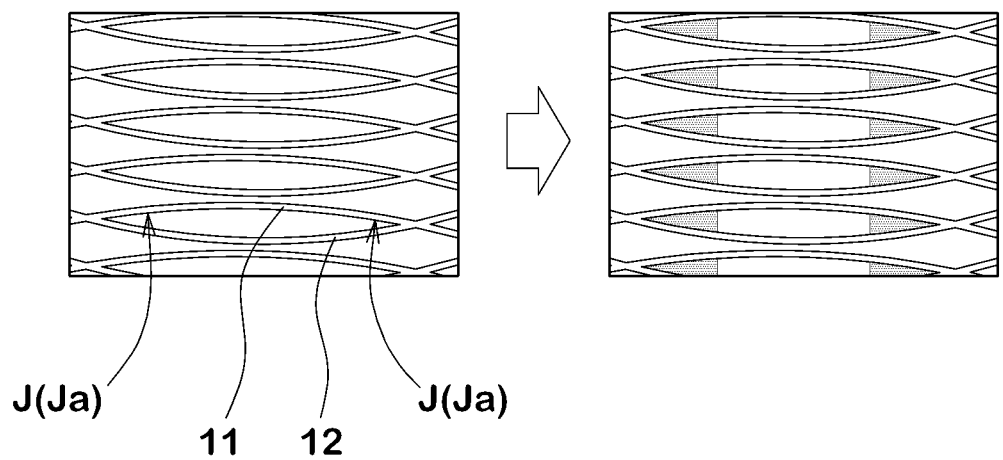
FIGS. 4A and 4B are side views of the serration pattern for explaining the advantage of the present invention.
Figure 4B:
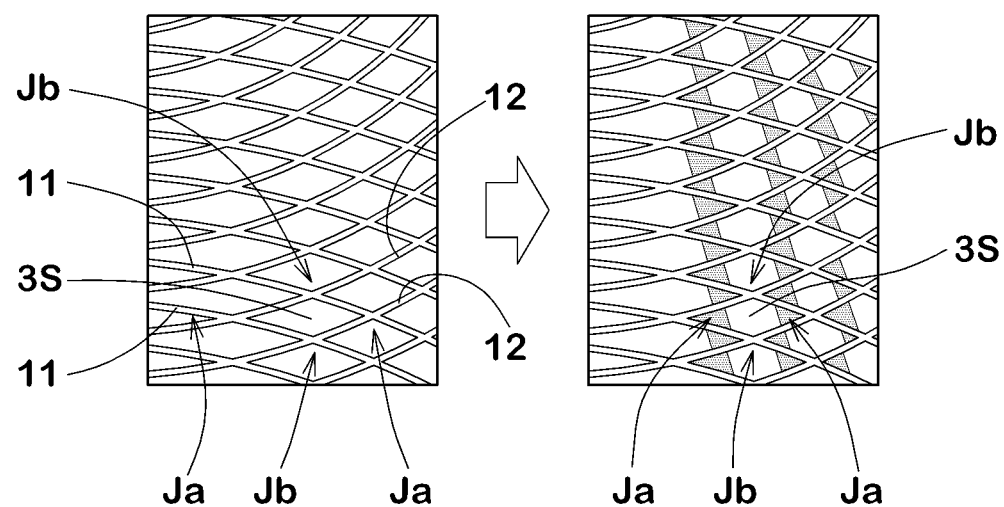

Referring to FIGS. 4A and 4B, due to a shadow of ridges 11, 12, a darkly visible field in the overlapped region 6 is mainly offered in a vicinity of a corner (Ja) where first and second arc-shaped ridges 11, 12 cross each other with an acute angle. On the other hand, a brightly visible field in the overlapped region 6 is mainly offered in a vicinity of a corner (Jb) of a bottom of the serration pattern 3 by receiving much light, where first and second arc-shaped ridges 11, 12 cross each other with an obtuse angle.

Therefore, the serration pattern 3 in accordance with the present embodiment provides observers with large lightness change as well as a pattern change so that the advantage for hiding the dent or bulge inconspicuously is improved while providing an excellent design. Additionally, since the serration pattern 3 in accordance with the present embodiment needs not to heighten its ridges improving hiding advantage as mentioned above, a mark for identifying the lightest or heaviest portions of the tire would be able to easily and firmly fix on the serration portion 3.

In case that radii of curvature R1$i$, R2$i$ of the first and second innermost arc-shaped ridges 11$i$, 12$i$ are less than 0.5 mm, it would be difficult to offer the lightness change on the serration pattern 3 being widely covered with shadow due to high density of ridges. By contrast, in case that radii of curvature R1$i$, R2$i$ of the first and second innermost arc-shaped ridges 11$i$, 12$i$ are more than 10.0 mm, damage such as a crack tends to be generated from the first and second innermost arc-shaped ridges 11$i$, 12$i$.

In case that intervals P between ridges are less than 1.0 mm, it would be difficult to offer the lightness change on the serration pattern 3 being widely covered with shadow due to high density ridges. By contrast, in case that intervals P between ridges are more than 2.0 mm, it would be also difficult to offer the lightness change on the serration pattern 3 being hardly covered with shadow due to low density of ridges.

In case that cross sectional widths W of ridges 11, 12 are less than 0.1 mm, such thin ridges would be difficult to mold. By contrast, in case that cross sectional widths W of ridges 11, 12 are more than 0.6 mm, it would be difficult to offer the lightness change on the serration pattern 3 due to thick ridges.

In case that cross sectional heights H of ridges 11, 12 are less than 0.2 mm, such low ridges would be difficult to offer the lightness change on the serration pattern 3. By contrast, in case that cross sectional heights H of ridges 11, 12 are more than 0.6 mm, it would be difficult to bond the mark thereon.

In another aspect of the invention, various trademarks such as characters, numerals and figures (not shown) may be provided on the serration pattern 3.

Figure 5A:
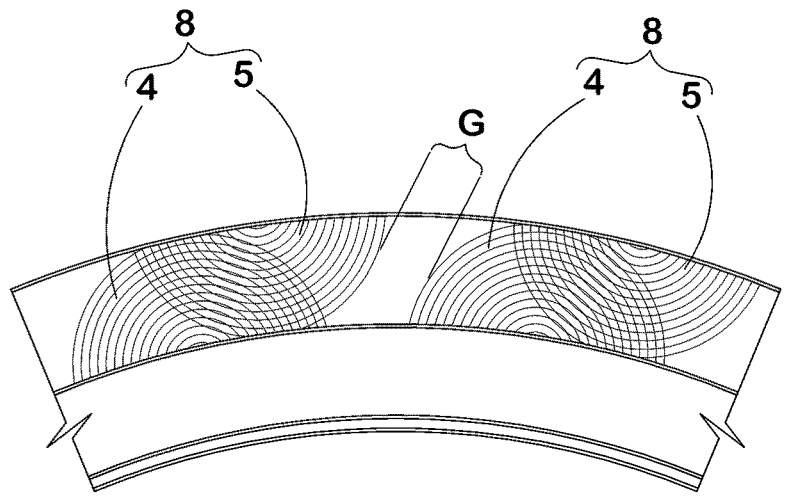
FIGS. 5A and 5B are side views of serration patterns in accordance with other aspects of the present invention.
Figure 5B:
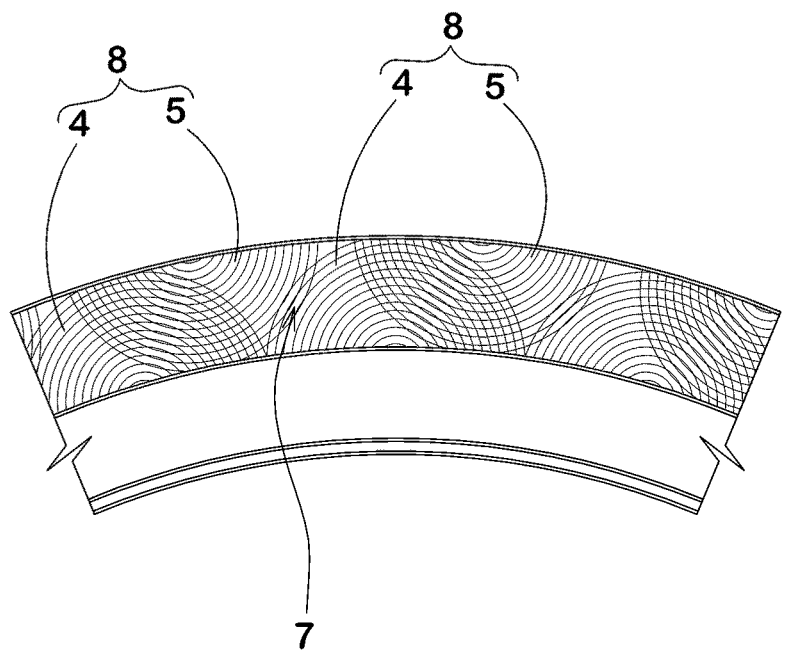

As for adjacent two serration pairs 8, the outermost first arc-shaped ridge 11 of one of serration pairs 8 and the outermost second arc-shaped ridge 12 of the other one of serration pairs 8 are circumscribed each other. In another aspect of the embodiment, a gap G may be provided between adjacent two serration pairs 8, 8 as shown in FIG. 5A. In still further aspect of the embodiment, adjacent two serration pairs 8, 8 may be arranged so as to partially overlap each other to form an overlapped field 7. In this aspect, adjacent two first serration groups 4, 4 do not overlap each other, and adjacent two second serration groups 5, 5 do not overlap each other.

The present invention is more specifically described and explained by means of the following Examples and References. It is to be understood that the present invention is not limited to embodiments mentioned above and Examples described later.

Comparison Test

Figure 6:
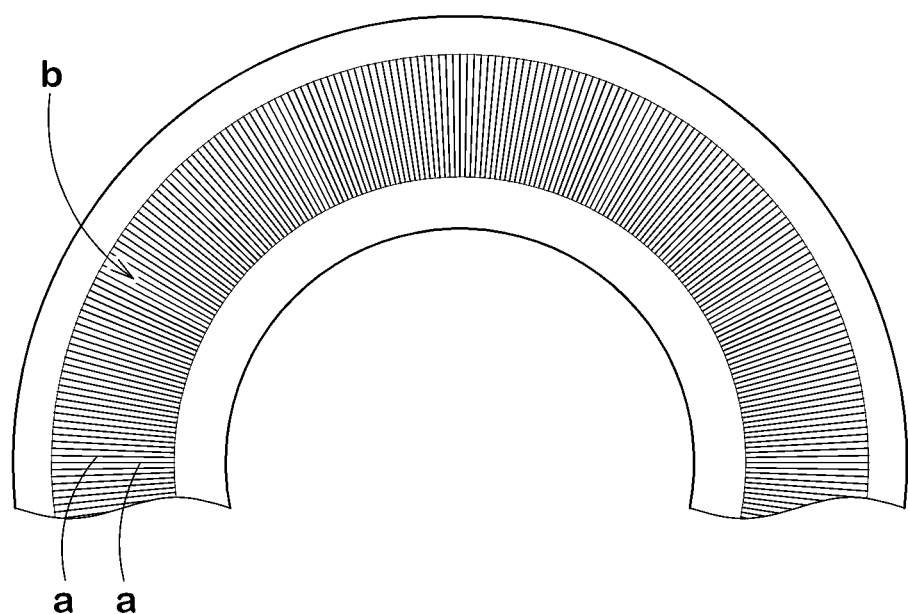
FIG. 6 is a side view of a conventional tire with a serration pattern.

Pneumatic tires having a tire size of 195/65/R15 with serration patterns shown in FIGS. 1 to 2 were manufactured based on Table 1, and tested with respect to hiding effect of bulges and/or dents, design appearance, bonding strength of a mark. Each ridge had a triangular cross section as shown in FIG. 3. Additionally, first arc-shaped ridges and second arc-shaped ridges have the same cross sections and intervals. The specifications of tires are the same except for the details in Table 1. The tire indicated in Ref.1 had a serration pattern that includes straightly extending ridges as shown in FIG. 6. Test methods are as follows.

Hiding Effect of Bulges and/or Dents:

Each test tire was mounted on a wheel rim with an inner pressure of 230 kPa for checking its sidewall appearance. An observer checked the serration pattern of each test tire with his naked eyes on sunny day outdoor whether bulges and/or dents are hidden or not. The results were indicated shown in Table 1 by a score based on Ref.1 being 100. The larger the score, the better the effect is.

Design Appearance Test:

An observer checked the design appearance of serration pattern of each test tire by his feeling. The results were indicated shown in Table 1 by a score based on Ref.1 being 100. The larger the score, the better the design is.

Bonding Strength of Marks Test:

A marking seal was pasted on the serration pattern in each tire using a marking apparatus. An observer checked the bonding strength of the seal by his feeling. The results were indicated shown in Table 1 by a score based on Ref.1 being 100. The larger the score, the better the strength is.

Test results are shown in Table 1. From the test results, it was confirmed that hiding effect of bulges and/or dents, design appearance, bonding strength of a mark of tires in accordance with the present invention can be effectively improved compared to references.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- | --- |
| Ridge configuration | FIG. 6 | Arc | Arc | Arc | Arc | Arc | Arc | Arc | Arc | Arc | Arc |
| Serration over lapped region | None |  |  |  |  |  | Provided |  |  |  |  |
| innermost ridge radius Ri (mm) | — | 8 | 0.4 | 0.5 | 10 | 11 | 8 | 8 | 8 | 8 | 8 |
| Interval P between ridges (mm) | 1.5 | 1.5 | 1.5 | 1.5 | 1.5 | 1.5 | 0.5 | 1 | 2 | 2.5 | 1.5 |
| Ridge width W (mm) | 0.2 | 0.2 | 0.2 | 0.2 | 0.2 | 0.2 | 0.2 | 0.2 | 0.2 | 0.2 | 0.05 |
| Ridge height H (mm) | 0.3 | 0.3 | 0.4 | 0.4 | 0.4 | 0.4 | 0.4 | 0.4 | 0.4 | 0.4 | 0.4 |
| Distance L (mm) | — | 40 | 40 | 40 | 40 | 40 | 40 | 40 | 40 | 40 | 40 |
| Hiding effect | 100 | 130 | 100 | 110 | 105 | 100 | 100 | 120 | 120 | 105 | 130 |
| Design appearance | 100 | 130 | 110 | 120 | 120 | 115 | 105 | 120 | 120 | 105 | 130 |
| Bonding strength of mark | 100 | 110 | 110 | 110 | 110 | 110 | 115 | 110 | 110 | 100 | 90 |

|  | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
| --- | --- | --- | --- | --- | --- | --- | --- | --- | --- | --- | --- | --- |
| Ridge configuration | Arc | Arc | Arc | Arc | Arc | Arc | Arc | Arc | Arc | Arc | Arc | Arc |
| Overlapped region |  |  |  |  |  | Provided |  |  |  |  |  |  |
| innermost ridge radius Ri (mm) | 8 | 8 | 8 | 8 | 8 | 8 | 8 | 8 | 8 | 8 | 8 | 8 |

TABLE 1-continued

| Interval P between ridges (mm) | 1.5 | 1.5 | 1.5 | 1.5 | 1.5 | 1.5 | 1.5 | 1.5 | 1.5 | 1.5 | 1.5 | 1.5 |
|---|---|---|---|---|---|---|---|---|---|---|---|---|
| Ridge width W (mm) | 0.1 | 0.5 | 0.6 | 0.7 | 0.2 | 0.2 | 0.2 | 0.2 | 0.2 | 0.2 | 0.2 | 0.2 |
| Ridge height H (mm) | 0.4 | 0.4 | 0.4 | 0.4 | 0.1 | 0.2 | 0.6 | 0.7 | 0.4 | 0.4 | 0.4 | 0.4 |
| Distance L (mm) | 40 | 40 | 40 | 40 | 40 | 40 | 40 | 40 | 10 | 20 | 60 | 70 |
| Hiding effect | 130 | 125 | 120 | 105 | 90 | 100 | 110 | 120 | 105 | 110 | 110 | 105 |
| Design appearance 100 | 130 | 120 | 115 | 110 | 95 | 100 | 100 | 105 | 110 | 120 | 120 | 105 |
| Bonding strength of mark | 100 | 115 | 118 | 120 | 110 | 108 | 100 | 85 | 110 | 110 | 110 | 110 |

The invention claimed is:

1. A pneumatic tire comprising:
a pair of sidewall portions, at least one of said sidewall portions having a radially outer region being radially outside than a tire maximum width position of its outer surface,
the radially outer region being provided with a circumferentially extending radially inner periphery edge, a circumferentially extending radially outer periphery edge, and a serration pattern formed between the radially inner periphery edge and the radially outer periphery edge, said serration pattern comprising a plurality of serration pairs each of which comprises a first serration group and a second serration group arranged in a circumferential direction of the tire so as to overlap partially with each other,
said first serration group comprising a plurality of concentrically arranged first arc-shaped ridges at regular intervals around a first center point O1, wherein the first center point O1 is provided within 10 mm from the radially inner peripheral edge,
said second serration group comprising a plurality of concentrically arranged second arc-shaped ridges at regular intervals around a second center point O2 that is located radially outside than the first center point O1 of said first serration group, wherein the second center point O2 is provided within 10 mm from the radially outer peripheral edge, and
in circumferentially adjacent serration pairs, an outermost first arc-shaped ridge of said first serration group of one of the adjacent serration pairs and an outermost second arc-shaped ridge of said second serration group of the other one of the adjacent serration pairs circumscribe each other,
wherein the plurality of concentrically arranged first arc-shaped ridges terminate at the radially inner periphery edge, and the plurality of concentrically arranged second arc-shaped ridges terminate at the radially outer periphery edge.

2. The tire according to claim 1, wherein said first arc-shaped ridges and said second arc-shaped ridges have the same cross sections.

3. The tire according to claim 2, wherein said first arc-shaped ridges and said second arc-shaped ridges have the same intervals.

4. The tire according to claim 1, wherein
said first serration group comprises a radially innermost first arc-shaped ridge having a radius of curvature in a range of from 0.5 to 10.0 mm, and
said second serration group comprises a radially innermost second arc-shaped ridge having a radius of curvature in a range of from 0.5 to 10.0 mm.

5. The tire according to claim 4, wherein
said first arc-shaped ridges and said second arc-shaped ridges have intervals P in a range of from 1.0 to 2.0 mm,
said first arc-shaped ridges and said second arc-shaped ridges have cross sectional widths W in a range of from 0.1 to 0.6 mm,
said first arc-shaped ridges and said second arc-shaped ridges have cross sectional heights H in a range of from 0.2 to 0.6 mm, and
a circumferential length L between the first center point O1 and the second center point O2 is in a range of from 20 to 60 mm.

6. The tire according to claim 1, wherein
said first arc-shaped ridges protrude radially outwardly of the tire with respect to the radially inner periphery edge, and
said second arc-shaped ridges protrude radially inwardly of the tire with respect to the radially outer periphery edge.

7. The tire according to claim 1, wherein the first center point O1 is located radially inwardly of the radially inner peripheral edge, and the second center point O2 is located radially outwardly of the radially outer peripheral edge.

8. The tire according to claim 1, wherein a radial distance (TW) between the radially inner periphery edge and the radially outer periphery edge is smaller than a radius of curvature of the outermost first arc-shaped ridge of said each first serration group and a radius of curvature of the outermost second arc-shaped ridge of said each second serration group.

9. The tire according to claim 1, wherein in circumferentially adjacent serration pairs, the outermost first arc-shaped ridge of said first serration group of one of the adjacent serration pairs is not in contact with the outermost first arc-shaped ridge of said first serration group of the other one of the adjacent serration pairs.

10. The tire according to claim 1, wherein if the distance between the first center point O1 and the radially inner periphery edge is La, $R1i$ is the radius of curvature of the innermost first arc-shaped ridge of the first serration group, and P is the interval between adjacent first arc-shaped ridges, then the entire first serration group satisfies the following relationship:

$$0.5 \leq (R1i - La)/P \leq 1.5.$$

11. The tire according to claim 10, wherein if the distance between the second center point O2 and the radially inner periphery edge is Lb, $R2i$ is the radius of curvature of the innermost second arc-shaped ridge of the second serration group, and P is the interval between adjacent second arc-shaped ridges, then the entire first serration group satisfies the following relationship:

$$0.5 \leq (R2i - Lb)/P \leq 1.5.$$

12. The tire according to claim 1, wherein if the distance between the second center point O2 and the radially inner periphery edge is Lb, $R2i$ is the radius of curvature of the innermost second arc-shaped ridge of the second serration group, and P is the interval between adjacent second arc-shaped ridges, then the entire first serration group satisfies the following relationship:

$$0.5 \leq (R2i-Lb)/P \leq 1.5.$$

13. A pneumatic tire comprising:
a pair of sidewall portions, at least one of said sidewall portions having a radially outer region being radially outside than a tire maximum width position of its outer surface,
the radially outer region being provided with a circumferentially extending radially inner periphery edge, a circumferentially extending radially outer periphery edge, and a serration pattern formed between the radially inner periphery edge and the radially outer periphery edge, said serration pattern comprising a plurality of serration pairs each of which comprises a first serration group and a second serration group arranged in a circumferential direction of the tire so as to overlap partially with each other,
said first serration group comprising a plurality of concentrically arranged first arc-shaped ridges at regular intervals around a first center point O1, wherein the first center point O1 is provided within 10 mm from the radially inner peripheral edge,
said second serration group comprising a plurality of concentrically arranged second arc-shaped ridges at regular intervals around a second center point O2 that is located radially outside than the first center point O1 of said first serration group, wherein the second center point O2 is provided within 10 mm from the radially outer peripheral edge, and in circumferentially adjacent serration pairs, an outermost first arc-shaped ridge of said first serration group of one of the adjacent serration pairs and an outermost second arc-shaped ridge of said second serration group of the other one of the adjacent serration pairs circumscribe each other, wherein in circumferentially adjacent serration pairs, the outermost first arc-shaped ridge of said first serration group of one of the adjacent serration pairs is not in contact with the outermost first arc-shaped ridge of said first serration group of the other one of the adjacent serration pairs, and wherein in circumferentially adjacent serration pairs, the outermost second arc-shaped ridge of said second serration group of one of the adjacent serration pairs is not in contact with the outermost second arc-shaped ridge of said second serration group of the other one of the adjacent serration pairs.

* * * * *